Aug. 28, 1934.     R. F. GOECKE     1,971,557
LIQUID TREATING APPARATUS
Filed June 9, 1933     3 Sheets-Sheet 1
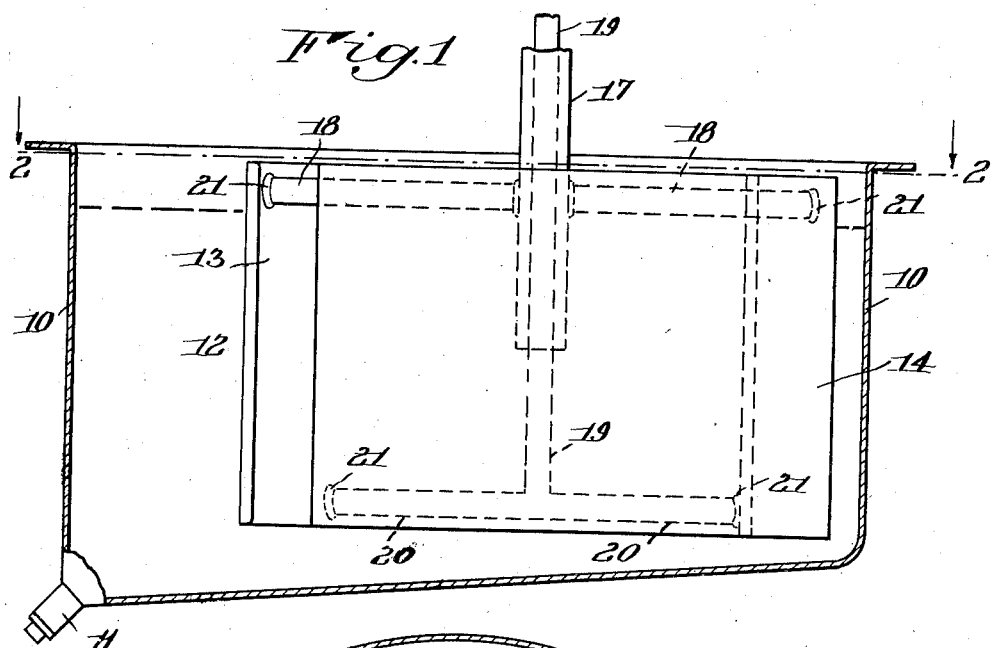
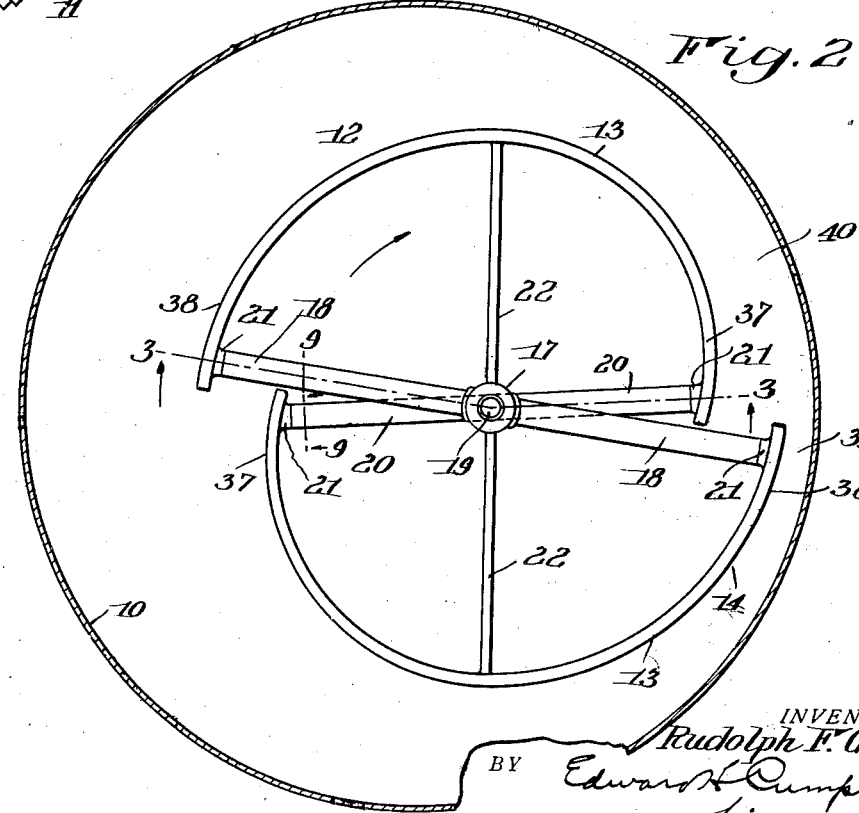
INVENTOR
Rudolph F. Goecke
BY Edward H. Cumpston
his ATTORNEY

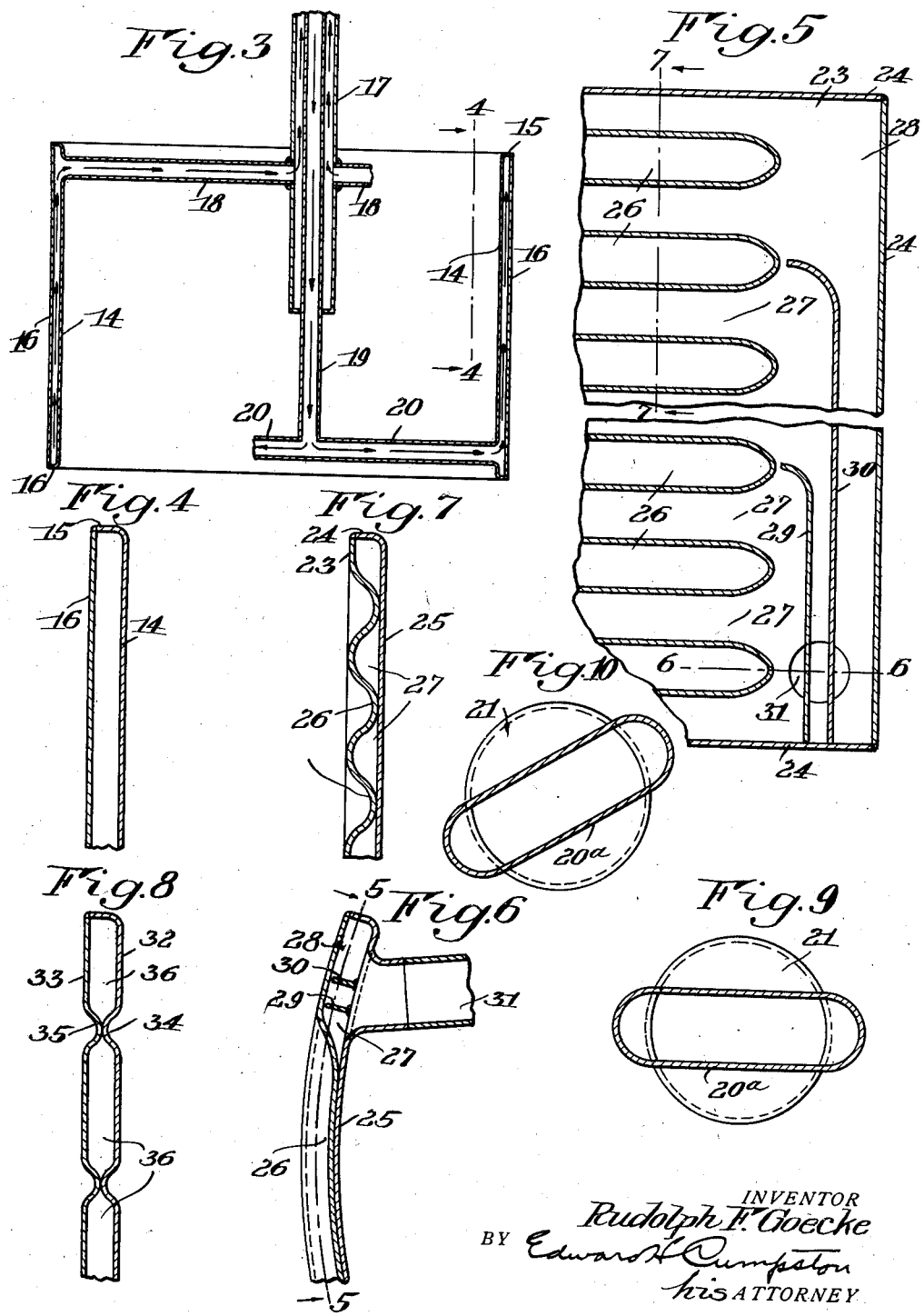

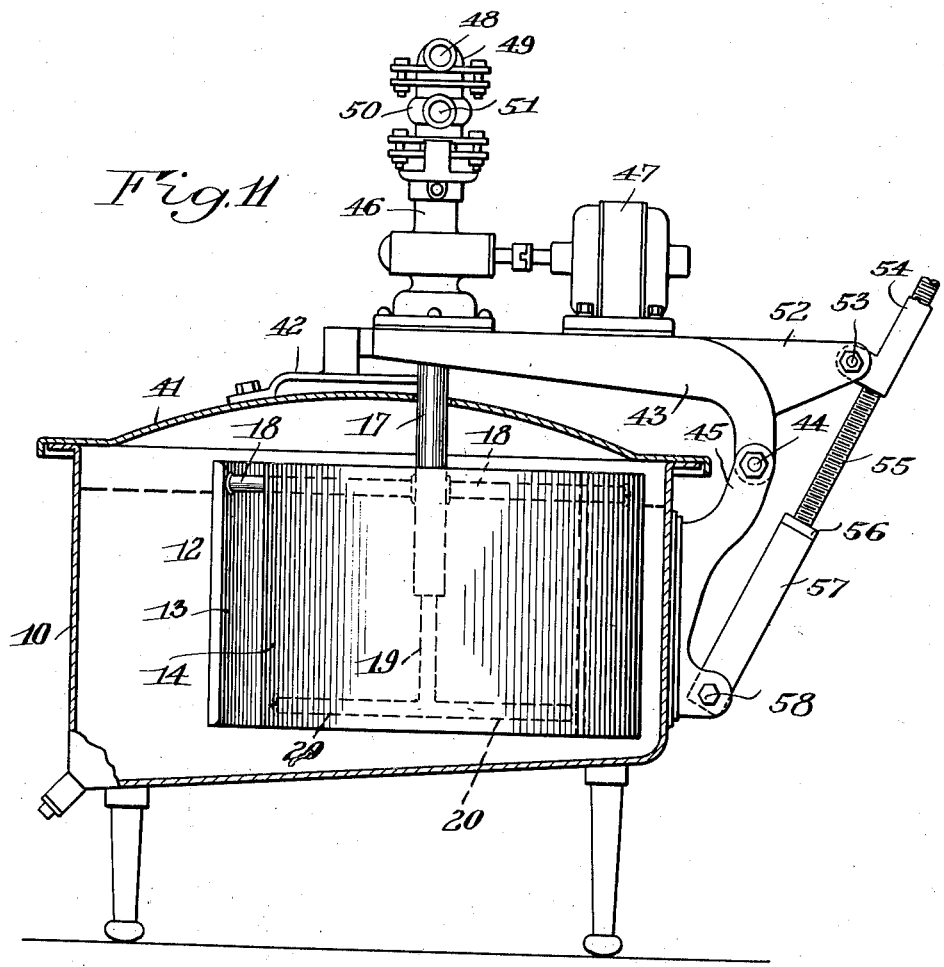

Patented Aug. 28, 1934

1,971,557

UNITED STATES PATENT OFFICE 1,971,557

LIQUID TREATING APPARATUS

Rudolph F. Goecke, Elyria, Ohio, assignor to The Pfaudler Co., Rochester, N. Y., a corporation of New York Application June 9, 1933, Serial No. 675,141

19 Claims. (Cl. 257—104)

The present invention relates to liquid treating apparatus and has for its object to provide improved apparatus of this class adapted for treating or processing various liquids, and liquid food products and is particularly adapted for use in pasteurizing or otherwise treating or processing milk, cream, and the like in a rapid, efficient, and economical manner.

A further object of the invention is to provide improved sanitary apparatus for effectively agitating and at the same time heating or cooling various liquids and semi-liquids to prepare or condition the same for the market.

Another object of the invention is to provide in apparatus of the class described, improved unitary heat-exchange means designed to have relatively large unbroken or unobstructed surfaces whereby said means may be quickly and effectively cleaned and a saving may be effected in the cost of labor required for the cleaning operations.

A further object of the invention is to provide a combined heat-exchange and liquid circulating device for use in liquid holding containers designed to have a maximum heating or cooling surface with a minimum displacement of the contents of the container.

A further object of the invention is to provide improved means for circulating liquid within a processing tank or container in a manner to facilitate expulsion of air, gas and volatile matter from the liquid while treating or processing the same within the tank.

A further object of the invention is to provide a sanitary heat exchange liquid circulating unit designed for rotation in a liquid holding tank and adapted to effectively circulate the liquid while heating or cooling the same in a manner to both facilitate thorough mixing of the liquid and the breaking up of the semi-solids contained in the liquid.

Another object of the invention is the provision of simplified and improved apparatus of the character described embodying relatively few parts which are economical to construct, easy to operate, and durable and efficient in service.

To these and other ends the invention resides in certain improvements and combinations of parts, all as will be hereinafter more fully described, the novel features being pointed out in the claims at the end of the specification.

In the drawings:

Fig. 1 is a sectional elevation of apparatus embodying the invention;

Fig. 2 is a horizontal section taken on line 2—2 of Fig. 1;

Fig. 3 is a vertical section taken on line 3—3 of Fig. 2;

Fig. 4 is a fragmentary sectional elevation taken on line 4—4 of Fig. 3;

Fig. 5 is a fragmentary sectional elevation taken on line 5—5 of Fig. 6 showing a modified form of agitator;

Fig. 6 is a horizontal section taken on line 6—6 of Fig. 5;

Fig. 7 is a vertical section taken on line 7—7 of Fig. 5;

Fig. 8 is a fragmentary sectional elevation showing another modification of the agitator;

Fig. 9 is a transverse section through one of the inlet pipes taken on line 9—9 of Fig. 2;

Fig. 10 is a similar transverse section showing the pipe inclined to the horizontal;

Fig. 11 is a part sectional elevation of the tank showing the agitator mounting and operating means thereon.

The same reference numerals throughout the several views indicate the same parts.

The embodiment of the invention shown in the drawings comprises a tank or container 10 of any preferred form, preferably of cylindrical construction and one which is provided with a suitable outlet valve fitting 11 as shown in Fig. 1.

The combined agitator and heat transfer device comprises a unitary structure, indicated generally at 12, and is preferably formed of oppositely arranged similarly constructed sections 13, generally semi-circular in shape and comprising vertically extending walls affording impellers for circulating and agitating the liquid within the container. Each section is of hollow construction and is preferably formed of relatively thin sheet material comprising, for example, a thin steel plate 14 having a peripheral flange 15 to which is secured, as by welding, an outer plate 16 as shown in Figs. 3 and 4. The plates may be formed of any suitable non-rusting enameled or unenameled material such, for example, as stainless steel which lends itself readily to the manufacture of the sections and which will retain a high degree of polish, thus affording a sanitary unit which can be readily and quickly cleaned from time to time. Ease in cleaning is also facilitated by constructing the sections, as shown, to provide large unbroken or unobstructed surfaces having smooth contours substantially throughout their entire areas.

A hollow shaft or tube 17, mounted for operation as hereinafter described, forms a support for the agitator and is connected with the sections 13 by means of the conduits 18 which preferably form the liquid outlet pipes of the sections.

Extending through the shaft is a supply pipe 19, from the lower end of which extend the inlet pipes or conduits 20 which are suitable connected with the sections 13 adjacent the bottom edges thereof.

While it is preferred to use the inner pipe 19 and the pipes 20 connected therewith to supply the heating or cooling medium to the heat transfer sections, the same may be used as outlet conduits if desired, in which case the hollow shaft 17 and pipes 18 will be used as the supply conduits.

The inner walls of the sections 13 are provided with outwardly struck annular portions 21 for receiving the outer ends of the pipes 18 and 20, said ends being united with the portions 21 preferably by welding. The inner ends of the pipes 18 are rigidly connected with the walls of the hollow shaft 17, preferably by welding.

The conduits 20 at points between the pipe 19 and the sections 13 may be flattened to a certain degree as shown at 20a in Fig. 9 whereby to strengthen the same and to insure the flow of the heating or cooling medium therethrough in a relatively thin stream in order to more effectively heat or cool the liquid to be treated in the tank 10.

If preferred the flattened portions 20a of the pipes may be inclined to the horizontal as shown in Fig. 10. The liquid in the pipes constructed as shown in Fig. 10 will tend to shift laterally therein, due to centrifugal action produced by the rapid rotation of the parts, thus increasing the effectiveness of the pipes by providing for agitation of the heating or cooling medium therein.

The pipes or conduits 18 and 20 serve as supporting and bracing means for the opposing sections 13 whereby a rigid and unitary structure is afforded for agitating and heating or cooling the liquid in the tank 10. The central portions of the sections are also connected with the hollow shaft 17 and are firmly braced by means of suitable struts 22 as shown in Fig. 2.

The agitator may be located either concentrically or eccentrically with respect to the axis of the liquid holding tank, but preferably the latter, as shown in Figs. 1 and 2.

In the modification shown in Figs. 5 to 7 inclusive the outer walls 23 of the sections are corrugated and have their edges connected with the peripheral flanges 24 of the inner walls 25 preferably by welding. The inwardly extending corrugated portions 26 of the plate 23 are seated on the inner face of the inner wall 25 of the section as shown in Fig. 7, to which said portions are preferably connected as by spot welding. The corrugations afford horizontally disposed channels 27 through which the heating or cooling medium is free to circulate from the inner to the outer end of the section. The corrugations are terminated short of the ends of the sections as indicated in Fig. 5 to afford vertically disposed passageways 28 whereby to provide for a head or column of liquid at each end of the section, thus insuring a more even distribution of the liquid to the channel shaped passages 27 extending longitudinally of the section.

Moreover a more uniform flow of the liquid to the passages 27 is afforded by means of the baffle plates 29 and 30, the uper ends of which are curved inwardly, whereby each controls the flow of the liquid to a predetermined number of the passages 27. The baffle plates are so located with respect to the inlet 31 of the section as to separate the inflowing stream of liquid into three separate columns for discharge to the upper, lower, and intermediate groups of passageways 27 separated by the baffle plates as indicated in Fig. 5. Thus an even distribution of the heating or cooling medium is provided for throughout the interiors of the heat transfer sections.

It will be understood that the outlet ends of the heat transfer sections may also be equipped with baffles similar to those shown in Fig. 5 for controling the flow of the liquid through said outlet ends.

Furthermore the non-corrugated sections shown in Figs. 3 and 4 may also be provided with baffles similar to those shown in Fig. 5, in which case the baffles may be made continuous from the inlet to the outlet ends of the sections whereby to insure even distribution of the circulating liquid throughout the length of the sections.

In the modification shown in Fig. 8 the corrugations are formed on the inner plate 32 as well as on the outer plate 33, as indicated at 34 and 35 respectively, said corrugations being in abutting relation as shown, and if desired may be connected, as for example by spot welding. The corrugations in this modification are terminated short of the ends of the sections in the manner shown in Fig. 5 and for the same purpose. Furthermore, in the modification shown in Fig. 8 baffle plates similar to those shown in Fig. 5 are provided at the opposite ends of the sections for the purpose of controling the flow of the liquid through the passages 36 of the sections.

It will be understood that the sections shown in Figs. 5 to 7 inclusive and in Fig. 8 will be assembled and connected in the same manner as the sections 13 shown in Figs. 1 to 3 inclusive and will have the same arrangement of inlet and outlet pipes and will also be provided with braces or struts corresponding to those shown in Fig. 2.

The combined liquid agitating and heat transfer device shown in Figs. 1 and 2 of the drawings is provided with outlet openings for the escape of the liquid therefrom which are formed by spacing apart the adjacent ends of the sections 13 as shown in Fig. 2. Each of the sections is so constructed as to form an impeller for the liquid whereby to effectively circulate and agitate the liquid within the tank 10. In other words the front or advance ends 37 of the sections are nearer their axis of rotation than the rear or trailing ends 38 and there is therefore a gradual increase in the distance from said axis of various points on the outer surfaces of the sections from front to rear of each so that the surfaces during rotation of the sections will gradually aproach nearer and nearer to one side of the tank until the distance between the tank wall and the impeller is reduced to a minimum, as indicated at 39 in Fig. 2.

It will be seen therefore that upon rotating one or more impellers constructed and arranged in the manner shown and described that a whirling movement will be imparted to the liquid causing it to flow between the tank wall and the impeller when the latter is aproaching said wall, or in other words into the space indicated by the reference character 40 in Fig. 2. In this manner the impeller will impart what may be termed a "squeezing" action to the liquid within the space 40 which is effected by gradually increasing the presure on the liquid, which continues until the impeller reaches the point at which the space between the latter and the tank is reduced to a minimum as indicated at 39 in Fig. 2. During this period of increase in pressure effective agitation and thorough mixing of the liquid is provided for and furthermore the solid or semi-solid particles therein are broken up, such for example, as lumps or particles of fat found in milk, cream, buttermilk, and other liquid food products.

Furthermore it will be understood that during operation of the agitator the milk or other liquid accumulating therein is continuously discharged outwardly therefrom through the openings between the ends of the sections. The discharge of the liquid from the agitator operates to create a down flow within the tank outside of the agitator, with the result that a replenishing supply of the liquid is constantly drawn into the agitator through the bottom thereof.

The circulation of the liquid in this manner not only results in thorough agitation and complete mixing of the same, but also insures rapid movement of the liquid in contact with the heating or cooling surfaces of the agitator during rotation thereof whereby to effectively heat or cool the liquid to the desired temperature.

It will be understood that during rotation of the liquid circulating and agitating heat transfer device within the liquid holding tank that a suitable heating or cooling medium will be kept circulating therethrough, depending on the nature of the treatment. For example, steam or hot water may be used as a heating medium while cold water, brine, or any other suitable refrigerant may be employed as a cooling medium.

The heating or cooling medium may be circulated through the heat transfer device by means of a pump or any other suitable means, or by gravity if preferred.

The constant circulation of the liquid to be treated in contact both with the inner and outer walls of the rotating heat transfer device makes it possible to complete the treating and processing operations in a minimum of time and in an efficient and economical manner.

The cover 41 for the container is mounted thereon in a manner permitting it to be easily and readily opened and closed when desired. The cover is connected with a bracket 42 on an arm 43 pivoted at 44 to a bracket 45 suitably connected with the side of the container as shown in Fig. 11.

The shaft 17 for supporting the agitator is extended upwardly through the cover and is mounted for rotation in suitable bearings in a casing 46 fixed on the arm 43. The driving means for the shaft preferably comprises an electric motor 47 mounted on the arm, the shaft of the motor being operatively connected with the agitator shaft by suitable means within the casing 46, not shown, such, for example, as a worm and worm gear.

The connections for the inlet and outlet of the liquid passing through the agitator may be made in any suitable manner. For example, the heating or cooling fluid may be supplied through a hose connected to an inlet opening 48 in a cap member 49 at the top of the casing 46. The interior of the cap is adapted to communicate with the inner tube 19 of the agitator shaft and the liquid returning from the agitator through the outer tube 17 is discharged into the intermediate member 50 on the casing 46 and flows out through the opening 51 of said member, to which may be connected a hose or other suitable discharge conduit, not shown.

Convenient and easily operable means is provided for oscillating the cover 41 to open and close the same. To this end the arm 43 is provided with a rearward extension 52 to which is pivoted at 53 a tube 54 through which extends a screw 55 provided at its upper end with an operating crank, not shown. The lower end of the screw is threaded into a nut 56 fixed in the end of a sleeve 57 pivoted at 58 to the lower end of the bracket 45 on the container 10.

When the screw is rotated in one direction it travels downwardly through the nut 56 into the sleeve 57 and thus pulls down the tube 54 which forces the extension 52 on the arm 53 downwardly. This elevates the cover and with it the agitator 12 and driving means therefor mounted on the cover for bodily movement therewith, thus moving the agitator out of the container to render it readily accessible for cleaning or repairs when needed, the interior of the tank being also rendered accessible for cleaning when the agitator is removed therefrom. It is obvious that the agitator may be returned to the tank merely by lowering the cover as by turning the screw 55 in the proper direction.

It will be understood that while the apparatus is particularly adapted for use in the processing or treatment of milk, cream, buttermilk and the like, it may be readily employed for the treating or processing of various other liquids or semi-liquids if desired.

By the circulation of steam or hot water through the heat transfer device, milk, or cream within the tank can be pasteurized or otherwise treated and subsequently cooled by the circulation of a suitable cooling medium through the heat transfer device while continuing to rotate it within the tank.

The oppositely disposed spiral-like sections 13 which extend vertically within the tank 10 are extremely effective, not only as an agitating and circulating unit for the liquid to be treated, but as a means adapted through cooperation with the walls of the tank to exert pressure on the liquid to a gradually increasing degree at each revolution of the device whereby to effectively break up or disintegrate the lump-like particles contained in the liquid as well as to force the liquid into more intimate contact with the heating or cooling surfaces of the unit.

The passing of the liquid into the heat transfer unit through the bottom thereof and outwardly through the openings in its sides serves not only to effectively agitate the liquid, but insures intimate contact of the same with the heating or cooling surfaces as the case may be.

As previously stated the heat transfer device has been designed particularly with a view to producing a sanitary construction and one which can readily be cleaned in a minimum of time and at a relatively low cost. This has been made possible by avoiding the use of projecting or protruding parts in the construction of the heat transfer sections 13 whereby to afford smooth and substantially unbroken surfaces at both sides of the sections.

Furthermore the present design of the heat exchange unit makes it possible to obtain a maximum heating area with a minimum displacement of the liquid within the tank and by corrugating one or more of the walls of the unit in the manner shown the device is rendered extremely effective as a means for rapidly heating the liquid as well as for cooling the same.

The heat exchange unit when mounted concentrically with the axis of the tank may be rotated at a speed affording maximum heat transmission to the liquid. The centrifugal force and inertia of the liquid will cause it to be discharged from the interior of the unit outwardly through the openings in the sides thereof with the result that additional liquid will be constantly drawn into the unit through the bottom of the same and also with the result that discharge of any air or gas contained in the liquid will be facilitated by the inward and upward flow of the currents of liquid passing into the unit. Furthermore a swirling motion will be imparted to the liquid at the outside of the unit due to the spiral-like construction of the latter, thus causing the liquid to travel along the outer surface of the tank at a speed conducive to a high rate of heat transmission.

Moreover by providing the tank with a jacket, not shown, for the circulation of a heating or cooling medium in contact therewith the effectiveness of the apparatus as a heating or cooling means for the liquid can be increased to a considerable degree.

To further control or regulate the flow of the currents of liquid within the tank the combined agitator and heat exchange unit is preferably mounted eccentrically within the tank as shown in Fig. 2 whereby congestion of and increase of pressure on the liquid is periodically afforded in the passage 40 by rotation of the unit, to facilitate mixing of the liquid and the breaking up of the lump-like particles of fat or other substances contained therein.

I claim:

1. In liquid treating apparatus, a liquid holding tank, and a combined agitator and heat exchange unit mounted for rotation within the tank, said unit comprising vertically disposed hollow walls arranged to form a liquid receiving chamber therebetween, said chamber being open at its lower end for the inflow of the liquid thereto and said unit being spaced from the bottom of the tank and having a lateral opening at one side thereof for the discharge of the liquid whereby to maintain circulation of the liquid through the chamber during rotation of the unit, said hollow walls having inlet and outlet conduits connected therewith for the circulation of a heating or cooling medium therethrough.

2. In liquid treating apparatus, a liquid holding tank, and a combined agitator and heat exchange unit mounted for rotation within the tank, said unit comprising oppositely disposed hollow impellers extending vertically within the tank and arranged to form a liquid receiving chamber therebetween, the impellers each having its ends disposed at unequal distances from the axis of rotation of the unit whereby the impellers are each made to cooperate with a portion of the wall of the tank to increasingly exert pressure on the liquid during partial revolution of the unit when rotating in one direction, the ends of said hollow impellers being spaced apart to afford openings between the impellers for the discharge of the liquid from said chamber and the chamber being open at its bottom for the inflow of the liquid thereto, said impellers having conduits connected therewith for the circulation of a heating of cooling medium therethrough.

3. In liquid treating apparatus, a liquid holding tank, and a combined agitator and heat exchange unit mounted for rotation within the tank, comprising a drive shaft and oppositely disposed spirally formed impellers on the shaft extending vertically within the tank and having passages for the circulation of a heating or cooling medium therethrough, said impellers being arranged to form a liquid receiving chamber therebetween, the chamber being open at its bottom to permit the liquid to flow therein and the impellers having their adjacent ends spaced apart to afford outlet openings for the discharge of the liquid from the chamber during rotation of the unit within the tank.

4. In liquid treating apparatus, a liquid holding tank, and a combined agitator and heat exchange unit mounted for rotation within the tank, comprising a pair of hollow adjacently mounted impellers each having its ends disposed at unequal distances from the axis of rotation of the unit, the adjacent ends of the impellers being spaced apart to form openings therebetween, said impellers having inlet and outlet conduits connected therewith for the circulation of a heating or cooling medium therethrough.

5. In liquid treating apparatus, a liquid holding tank, and a combined agitator and heat exchange unit mounted for rotation within the tank, comprising a drive shaft and a pair of hollow spirally formed impellers mounted on the shaft one opposite another, the impellers each having its ends disposed at unequal distances from the axis of the shaft, the shorter end of one impeller being opposite the longer end of the other and in spaced relation thereto, said impellers having inlet and outlet conduits connected therewith to provide for the circulation of a heating or cooling medium therethrough.

6. In liquid treating apparatus, a liquid holding tank, and a combined agitator and heat exchange unit mounted within the tank for rotation therein eccentrically thereof and comprising one or more spirally formed hollow impellers adapted for the circulation of a heating or cooling medium therethrough while rotating within the tank to agitate the liquid.

7. In liquid treating apparatus, a liquid holding tank, and a combined agitator and heat exchange unit mounted within the tank for rotation eccentrically thereof and comprising a plurality of hollow impellers extending vertically within the tank, each impeller having its ends disposed at unequal distances from the axis of rotation of the unit, the impellers being adapted for the circulation of a heating or cooling medium therethrough during rotation of the unit within the tank.

8. In liquid treating apparatus, a liquid holding tank, a liquid agitating unit mounted for rotation within the tank in spaced relation to the bottom thereof, said unit comprising vertically disposed walls affording a liquid receiving chamber therebetween, the chamber being open at the bottom of the unit for the inflow of liquid thereto, said walls forming oppositely arranged vertically disposed openings extending substantially the full height of the unit and affording discharge passages for the liquid whereby to maintain circulation of the liquid through the unit during rotation of the same within the tank.

9. In liquid treating apparatus, a liquid holding tank, and an agitating unit for the liquid rotatably mounted within the tank comprising vertically disposed walls forming a liquid receiving chamber therebetween, the walls being spaced apart at opposite sides of the unit to form vertically disposed discharge passages for the liquid substantially paralleling the axis of rotation of the unit, the bottom of the unit being open for the inflow of the liquid to said chamber and circulation of the liquid through the chamber and outwardly through said passages being maintained during rotation of the unit within the tank.

10. In liquid treating apparatus, a liquid holding tank and an agitating unit for the liquid rotatably mounted within the tank and comprising oppositely disposed vertically extending impellers arranged to form a liquid receiving chamber therebetween, the ends of the impellers overlapping at opposite sides of the unit to afford vertically extending discharge passages for the liquid, the bottom of the unit being open to permit the liquid to flow into the chamber for discharge outwardly through said passages during rotation of the unit within the tank.

11. In liquid treating apparatus, a liquid holding tank, and an agitating unit for the liquid rotatably mounted within the tank, comprising a drive shaft and oppositely arranged spirally formed impellers on the shaft extending vertically within the tank and arranged to form a liquid receiving chamber therebetween, the unit being open at its bottom to permit the liquid to flow into said chamber, said impellers having their adjacent ends spaced apart to afford outlet openings for the discharge of the liquid from the chamber during rotation of the unit within the tank.

12. In liquid treating apparatus, a liquid holding tank, and an agitating unit for the liquid rotatably mounted within the tank, comprising a drive shaft and a pair of oppositely arranged spaced impellers on the drive shaft, the impellers having their opposite ends disposed at unequal distances from the axis of the shaft and in spaced relation one to another.

13. In liquid treating apparatus, a combined agitator and heat exchange unit comprising a rotary support and vertically disposed hollow impellers on the support arranged to form a liquid receiving chamber therebetween, said unit having an opening for the passage of the liquid into the chamber and having a discharge passage for the liquid at one side thereof, said hollow impellers having inlet and outlet connections to provide for the circulation of a heating or cooling medium therethrough, the unit when rotating in the liquid holding tank operating to effect circulation of the liquid through said chamber.

14. In liquid treating apparatus, a combined agitator and heat exchange unit, comprising a rotary support and hollow vertically extending impellers on said rotary support each having its ends disposed at unequal distances from the axis of the support, said impellers having inlet and outlet connections to provide for the circulation of a heating or cooling medium therethrough.

15. In liquid treating apparatus, a combined agitator and heat exchange unit, comprising a rotary support and oppositely arranged hollow impellers on the support, one wall of each impeller being corrugated and cooperating with an opposing wall to afford passages for the circulation of a heating or cooling medium through the impeller, the impellers having inlet and outlet connections leading to and from the same.

16. In liquid treating apparatus, a combined agitator and heat exchange unit, comprising a rotary support and oppositely arranged hollow impellers connected with the support for rotation thereby and having liquid inlet and outlet openings leading to and from the same, one wall of each impeller being corrugated and cooperating with an opposing wall of the impeller to afford passages for the circulation of a heating or cooling liquid through the impellers and baffle plates within each impeller opposite the inlet opening thereof for separating the inflowing liquid into separate streams, the streams being each directed by the baffle plates to the inlet ends of a predetermined number of said passages.

17. In liquid treating apparatus, a combined agitator and heat exchange unit, comprising a rotary support and oppositely arranged hollow impellers connected with the support for rotation thereby and having liquid inlet and outlet openings leading to and from the same, one wall of each impeller being corrugated lengthwise of the section and cooperating with an opposing wall of the impeller to afford passages for the circulation of a heating or cooling medium through the impeller, the corrugations terminating short of the ends of the impeller to provide vertically disposed channels for the inflowing and outflowing liquid at the opposite ends of said passages, and baffle plates within the impellers extending vertically within said channels adapted to direct the circulating liquid in separate streams each through a selected number of the passages.

18. In liquid treating apparatus, a liquid holding tank, and a liquid agitating and impelling device rotatably mounted within the tank in spaced relation thereto and having its walls formed to provide a liquid receiving chamber, said device being open at one side for the inflow of the liquid to the chamber and having one or more passages for discharging the liquid from the chamber, one of said walls constructed to afford an impeller adapted during each revolution of the device to gradually narrow the opening between the tank at one side thereof and the impeller, the latter operating to flow the liquid through said opening and serving to effectively increase circulation and agitation of the liquid within the tank.

19. In liquid treating apparatus, a liquid holding tank, a hollow liquid agitating and impelling device having tubular inlet and outlet connections communicating therewith, said device being mounted within the tank in spaced relation to the bottom and side walls thereof and adapted for rotation by one of said connections, the walls of said device being formed to provide a vertically disposed liquid receiving chamber open at its bottom for the inflow of the liquid thereto and having one or more passages in its side walls for the discharge of the liquid from the chamber, one of the side walls of said device constructed to afford an impeller adapted during each revolution of the device to approach a portion of the tank wall and to gradually decrease the width of the opening between said wall portion and the impeller, the latter operating to force the liquid through said opening and serving to effectively increase circulation and agitation of the liquid within the tank.

RUDOLPH F. GOECKE.